United States Patent
Scheffler

(10) Patent No.: US 7,106,384 B1
(45) Date of Patent: Sep. 12, 2006

(54) METHOD AND DEVICE FOR SIMULTANEOUSLY REPRESENTING AT LEAST A FIRST AND A SECOND SEQUENCE OF PICTURES IN AN OVERALL PICTURE

(75) Inventor: Günter Scheffler, München (DE)

(73) Assignee: Micronas GmbH, Freiburg (DE)

( * ) Notice: Subject to any disclaimer, the term of this patent is extended or adjusted under 35 U.S.C. 154(b) by 0 days.

(21) Appl. No.: 09/913,103

(22) PCT Filed: Feb. 1, 2000

(86) PCT No.: PCT/DE00/00293

§ 371 (c)(1),
(2), (4) Date: Dec. 31, 2001

(87) PCT Pub. No.: WO00/48396

PCT Pub. Date: Aug. 17, 2000

(30) Foreign Application Priority Data

Feb. 9, 1999 (DE) .......................... 199 05 314

(51) Int. Cl.
*H04N 5/45* (2006.01)

(52) U.S. Cl. ........................ 348/567; 348/568
(58) Field of Classification Search ......... 348/564–568, 348/443, 447, 448, 459
See application file for complete search history.

(56) References Cited

U.S. PATENT DOCUMENTS

| | | | | |
|---|---|---|---|---|
| 5,369,442 A | | 11/1994 | Braun | ......................... 348/567 |
| 5,726,715 A | | 3/1998 | Endress | ....................... 348/565 |
| 5,729,300 A | | 3/1998 | Ahn | ........................... 348/564 |
| 6,008,854 A | * | 12/1999 | Shimizu | ..................... 348/445 |
| 6,160,590 A | * | 12/2000 | Shimizu et al. | ............. 348/581 |
| 6,310,656 B1 | * | 10/2001 | Miyazaki et al. | ........... 348/568 |
| 6,441,863 B1 | * | 8/2002 | Miyazaki et al. | ........... 348/567 |

FOREIGN PATENT DOCUMENTS

| | | |
|---|---|---|
| DE | 195 34 781 C1 | 1/1997 |
| EP | 0 304 236 A2 | 2/1989 |
| EP | 0 717 562 A1 | 6/1996 |
| EP | 0 739 130 A2 | 10/1996 |
| JP | 09-18800 * | 1/1997 |

* cited by examiner

*Primary Examiner*—David E. Harvey
(74) *Attorney, Agent, or Firm*—O'Shea, Getz & Kosakowski, P.C.

(57) ABSTRACT

The invention relates to a method and a device for simultaneously representing at least a first and a second sequence of pictures (M, S) in an overall picture. The inventive method is characterised in that picture data belonging to a picture of the first sequence of pictures (M) is stored in the form of a first picture data signal in a first picture memory ($SP_M$). Picture data belonging to a picture of the second sequence of pictures (S) is stored in the form of a second picture data signal in a second picture memory ($SP_S$). The picture data of the first and second picture data memory is read out according to a periodic screen signal (RS), whereby phase shift ($SHIFT_M$, $SHIFT_S$, $t_x$) of the screen signal (RS) can be adjusted according to the first and/or second picture data signal.

14 Claims, 4 Drawing Sheets

METHOD AND DEVICE FOR SIMULTANEOUSLY REPRESENTING AT LEAST A FIRST AND A SECOND SEQUENCE OF PICTURES IN AN OVERALL PICTURE

BACKGROUND OF THE INVENTION

The present invention relates to the field of video image processing, and in particular to an apparatus and method of displaying two or more video images on a display such as for example a television device.

In video display devices such as a television, flicker is removed from the pictures displayed on a screen in that the picture sequences, received from the video sources with a given display frequency, are displayed on the screen with twice this display frequency. The picture sequences delivered by the video sources are present especially as sequences of first and second half pictures, which are displayed on a screen in respective line-interleaved rasters.

A picture consisting of half pictures is displayed without flicker line-by-line in a reproduction raster, such that, in a periodic sequence, the odd picture lines, the so-called $\alpha$ raster, and the even picture lines, the so-called $\beta$ raster, are each scanned twice in immediate succession. With the so-called AABB transformation of a 50 Hz television picture, a first half picture is displayed in the $\alpha$ raster twice in immediate succession and a second half picture is similarly displayed in the $\beta$ raster. The displayed picture thus appears flicker-free to the human eye, with a frequency of 100 Hz.

From the DE 195 34 781 C1, a method is known for so-called picture-in-picture superimposition, such that a picture delivered from a video source is to be displayed on a small scale in a main picture. With this method, the superimposed picture is present as a half picture sequence with a reproduction frequency of 50 Hz. The second picture is present as a half picture sequence with twice the reproduction frequency, that is 100 Hz, each half picture of the main picture always being made available twice in immediate succession. To double the reproduction frequency of the superimposed picture, the first and second half pictures are always written into a half picture memory and are read out twice per write process. The timing of the read process, especially the read-start, is dependent on the display of the main picture.

Since the superimposed picture and the main picture are not made available synchronized, the problem can arise that while a half picture of the superimposed picture is being written into a half picture memory, a read process takes place that overtakes the write process. In the picture that is superimposed on the main picture, picture portions then become visible which were written into the memory in two different, that is temporally distant, write processes. Moving pictures show a troublesome displacement between these picture portions, which is called a "joint line." To prevent such a joint line, the known methods evaluate the phase shift between the superimposed picture and the main picture and, depending on the measured phase shift, it is decided whether the first half pictures or the second half pictures of the superimposed picture are to be displayed in the $\alpha$ raster and the respectively other half pictures in the $\beta$ raster. Here one utilizes the circumstance that, for some phase shifts, the read pointer can overtake the write pointer during read-out from one of the half picture memories while, with this phase shift, such an overtaking effect cannot occur during the read-out from the respectively other half picture memory. However, there are phase shifts between the superimposed picture and the main picture for which a joint line appears when reading out the superimposed picture from the picture memory, both when displaying the first half picture in the $\alpha$ raster and when displaying the second half picture in the $\alpha$ raster. The known method thus cannot prevent joint lines entirely.

Other known methods to prevent such joint lines utilize larger memories to prevent the read pointer from overtaking the write pointer. However, these methods presuppose not only more complex memories but also more complex memory space management.

Therefore, there is a need for an apparatus and method for the simultaneous display of a first picture sequence and a second picture sequence that is free of joint lines.

SUMMARY OF THE INVENTION

Briefly, according to an aspect of the present invention, picture data belonging to a picture of the first picture sequence are stored in the form of a first picture data signal in a first picture memory, and the picture data belonging to a picture of the second picture sequence are stored in the form of a second picture data signal in a second picture memory. The picture data are read out from the first and second picture memory according to the specification of a periodic raster signal, such that a phase shift of the raster signal can be adjusted in dependence on the first and/or second picture data signal. This adaptation of the phase shift of the raster signal makes it possible to read out the picture data from the first and second picture memory without the appearance of a joint line, while simultaneously displaying the picture sequences on a screen.

In one embodiment, the first and second picture sequences each include a sequence of half pictures, the picture data of the first half pictures are stored in a first half picture memory of the associated picture memory, and the picture data of the second half pictures are stored in a second half picture memory of the associated picture memory.

In another embodiment, the first picture data signal is decimated by a first decimation factor before being stored, and the phase shift of the raster signal is set in dependence on the first decimation factor. With a line-decimated display of a picture, the special problem arises that the picture information must be read out within a time interval which depends on the number of lines of the reduced picture and thus on the decimation factor, while the time interval needed for writing the information depends on the frequency at which the pictures of the picture sequences are available, and thus is constant. The read pointer can be prevented from overtaking the write pointer by adjusting the phase shift of the raster signal which controls the read-out process. In dependence on the first decimation factor.

The phase shift of the raster signal can be adjusted step-by-step, such that, in the first process step, a first phase shift is set in dependence on the first decimation factor, and in a second process step, a further phase shift with respect to the second picture data signal is set in dependence on the phase of the raster signal, which already has the first phase shift. Another phase shift is necessary if it happens that, when the picture data are read out from the second picture memory in accordance with the specification of the raster signal which has the first phase shift, the second picture sequence cannot be displayed in the overall picture without a joint line.

The phase of the second picture data signal is determined by evaluating a write pointer at the beginning of a period of the raster signal. If this evaluation shows that the line written into the second picture memory at the beginning of a period of the raster signal lies between a first critical line and a second critical line, then, in some circumstances, these picture data cannot be displayed without creating a joint line. Consequently, a further phase shift of the raster signal is required to prevent the occurrence of the joint line, and this is set in accordance with the phase shift of the raster signal with the first phase shift, relative to the second picture data signal.

The second picture sequence can be displayed without a joint line if the line written in at the beginning of a period of the raster signal lies above the first critical line, and the half picture memory is read out which has not just been written, if the line written in at the beginning of a period of the raster signal lies below the second critical line, and the half picture memory is read out which has been written last, if no half picture memory has been written into at the beginning of a period of the raster signal.

These and other objects, features and advantages of the present invention will become more apparent in light of the following detailed description of preferred embodiments thereof, as illustrated in the accompanying drawings.

DETAILED DESCRIPTION OF THE INVENTION

Unless otherwise specified, the same reference symbols in the figures designate the same signals or functional units with the same meaning. The index M refers to signals derived from a first picture sequence and to the functional units that were used to process these signals. Similarly, the index S refers to signals derived from a second picture sequence, and to the functional units that were used to process these signals.

The apparatus and method of the present invention displays, in one overall picture, a first and a second picture sequence M, S, delivered from two non-synchronous video sources. For the subsequent description, it is assumed that the first and second picture sequence M, S each includes a sequence of half pictures $A_M$, $B_M$, $A_S$, $B_S$, in accordance with the Phase Alternative Line (PAL) color television standard. These half pictures are available at a frequency of 50 Hz. The received half pictures should be displayed jointly on the screen and to prevent flicker should be reproduced at a frequency of 100 Hz.

Figure 1:
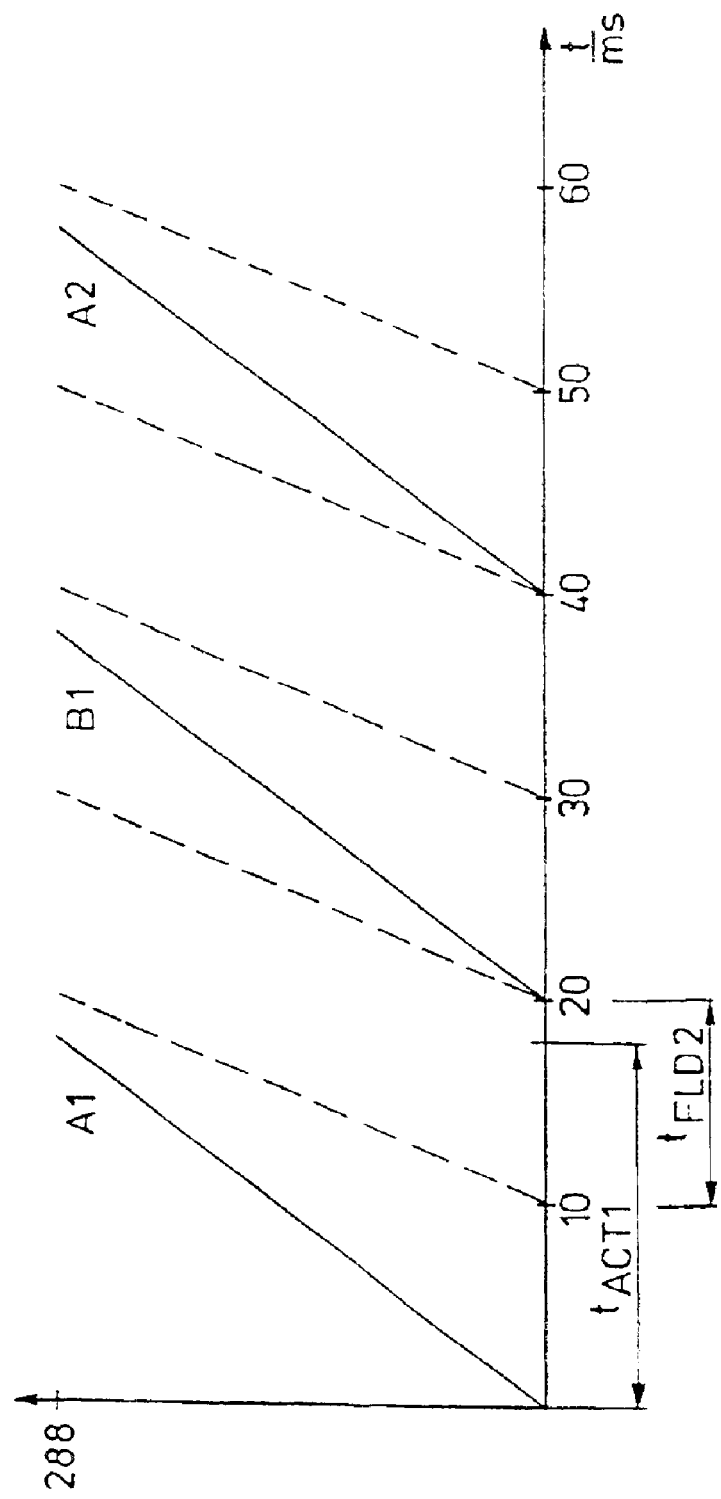
FIG. 1 shows a line index diagram of a picture sequence that is to be displayed.

FIG. 1 illustrates a line index diagram of a picture sequence delivered by a video source and including a sequence of first and second half pictures A1, B1, A2, . . . . Together with at least one other picture sequence likewise including a sequence of half pictures, this is to be displayed in an overall picture in accordance with the inventive apparatus and method. The half pictures A1, B1, A2, . . . are made available line-by-line with a frequency of 50 Hz. Each half picture in the embodiment shown here comprises 288 lines. The solidly drawn write pointers in FIG. 1, which rise over time, indicate the time progression by which the lines of the half pictures are made available and can be written into a picture memory. With the PAL standard, the time $t_{ACT1}$ needed to build up a half picture, is equal to 18.43 ms; this is derived from the product of the number of lines (288) and the time (64 µs) needed to scan a line.

With known methods for flicker-free display of a picture sequence with a half picture frequency of 50 Hz, the half pictures are read into a picture memory in such a way that each half picture is read out from the picture memory twice in immediate succession and displayed on the screen. The half pictures are shown on the screen in different rasters. The first half pictures A1, A2, . . . are displayed in the so-called α raster, which comprises the odd lines of the screen, and the second half pictures B1, B2, . . . are displayed in the so-called β raster, which comprises the even lines of the screen.

FIG. 1 illustrates the time progression by which the picture data are read out from the picture memory, in the form of read pointers represented by dashes. This shows that, after a half picture A1, B1, A2, . . . has been received and read in, this half picture is read out twice in succession. The read-out process takes place with a frequency of 100 Hz, so that a time interval $t_{FLD2}$=10 ms is available to read out a half picture in the case of the embodiment shown here. The important point here is that, during the double read-out, only such picture data are read out which were written into the picture memory during the same write process. If this is not the case, that is, if during one read-out process picture data are read out and displayed on the screen that belong to different half pictures, a displacement or a so-called joint line appears, especially with moving pictures, which is troublesome to a viewer. The appearance of such joint lines can be seen in the line index diagram, when the write pointer and the read pointer intersect. Such problems arise especially if the received picture is to be shown on the screen reduced, that is with a number of lines decimated by the decimation factor.

The inventive apparatus and method specifies that the picture data belonging to the first half pictures $A1_M$, $A2_M$, . . . of a picture sequence are stored in a first picture data memory $SPA_M$, and the picture data belonging to the second half pictures $B1_M$ of the first picture sequence are stored in a second picture data memory $SPB_M$. FIG. 2a illustrates the time progression of the write and read process for the first half picture memory $SPA_M$; FIG. 2b illustrates the write and read progression for the second half picture memory $SPB_M$. The solid lines represent write pointers, the dashed lines represent read pointers. The half pictures $A1_M$, $B1_M$, $A2_M$, . . . , to be stored are decimated by a decimation factor $DF_M$=1.5 relative to the half pictures received from a first video source, and each have 192 lines.

The picture data are read out from the half picture memories $SPA_M$, $SPB_M$ according to the specification of a raster signal, which controls the beginning of the read-out processes. To prevent joint lines, the earliest possible read-out of the picture information occurs with a time shift relative to the writing of the picture information. This time shift amounts to $t_x = t_{ACT1} - t_{ACT2}$, where the time duration $t_{ACT2}$, which is available for reading out the picture information from the half picture memory, is derived from the time duration $t_{ACT1}$ and the decimation factor $DF_M$, in accordance with the relationship $t_{ACT2}=t_{ACT1}/(2 \cdot DF_M)$. The read-out process repeats in time intervals $t_{FLD2}$, such that, in alternation, picture data are read out twice in immediate succession from the first half picture memory $SPA_M$ and from the second half picture memory $SPB_M$. The picture data from the first half picture memory are here displayed in the α raster, the picture data from the second half picture memory are displayed in the β raster, as is shown in FIG. 2c by the time progression of the raster sequence ααββ.

Figure 2:
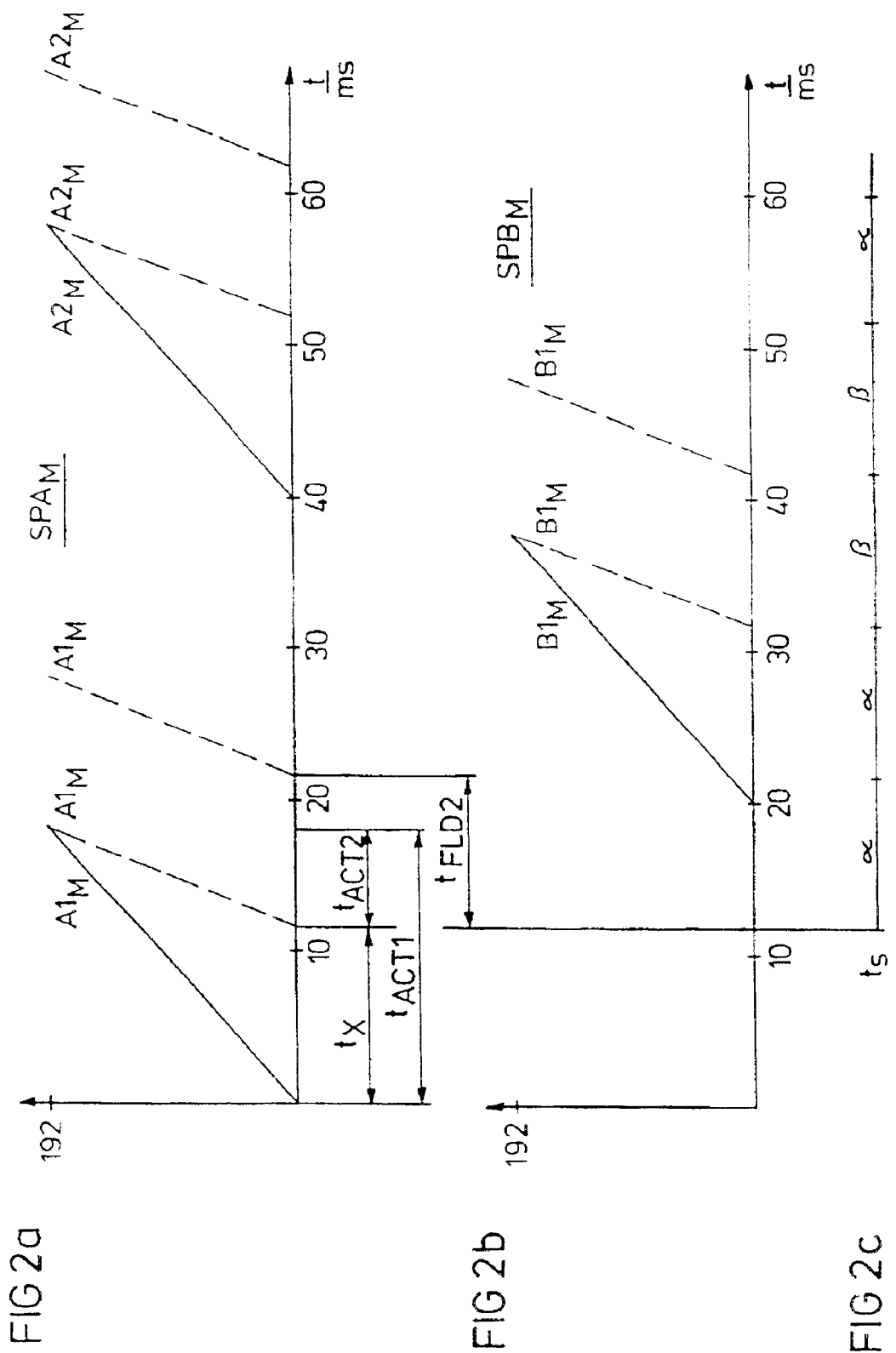
FIG. 2 shows line index diagrams for writing and reading, in two different half picture memories, a first picture sequence including a sequence of first and second half pictures (FIGS. 2a, b), and the time progression of α raster to display the overall picture (FIG. 2c)

The raster sequence shown in FIG. 2c illustrates the time intervals in which the α raster of the overall picture is written and the time intervals in which the β raster is written. During one raster phase, the screen of the overall picture is scanned once from top to bottom line-by-line. The read-out of the half picture memories $SPA_M$, $SPB_M$ at the beginning of the raster phases, as shown in FIG. 2, indicates that the first picture sequence is displayed in the upper region of the screen. If the decimated picture is to be displayed in the lower region of the screen, the half picture memories $SPA_M$, $SPB_M$ are read out at later times during the raster phases. The read pointers drawn in FIG. 2 are then shifted in time to the right. This later read-out is uncritical as regards the generation of joint lines. The phase shift $t_x$ of the picture data signal written into the half picture memories, with respect to the raster signal and the display raster, is preferably chosen such that the first picture sequence can be displayed without a joint line if the half picture memories $SPA_M$, $SPB_M$ are read out at the beginning of the α phase or β phase as shown in FIG. 2. The picture can then be shown without a joint line at an arbitrary position on the screen. The actual read-out moment within the raster is given by a position signal.

In order to display an arbitrarily reduced first picture sequence in the overall picture without a joint line, on the one hand the phase shift $t_x$ between the display raster or the raster signal which controls the read-out process and a picture data signal containing the picture information, depends on the decimation factor $DF_M$, and on the other hand the first and second half pictures are stored in different half picture memories. The described setting of the phase shift or the earliest possible moment for the read-out process is selected such that the decimated picture can be displayed without a joint line at an arbitrary position on the screen. The progression of the read-out process shown in FIG. 2 assumes the worst case situation wherein the decimated picture is to be displayed in the upper region of the screen.

Figure 3:
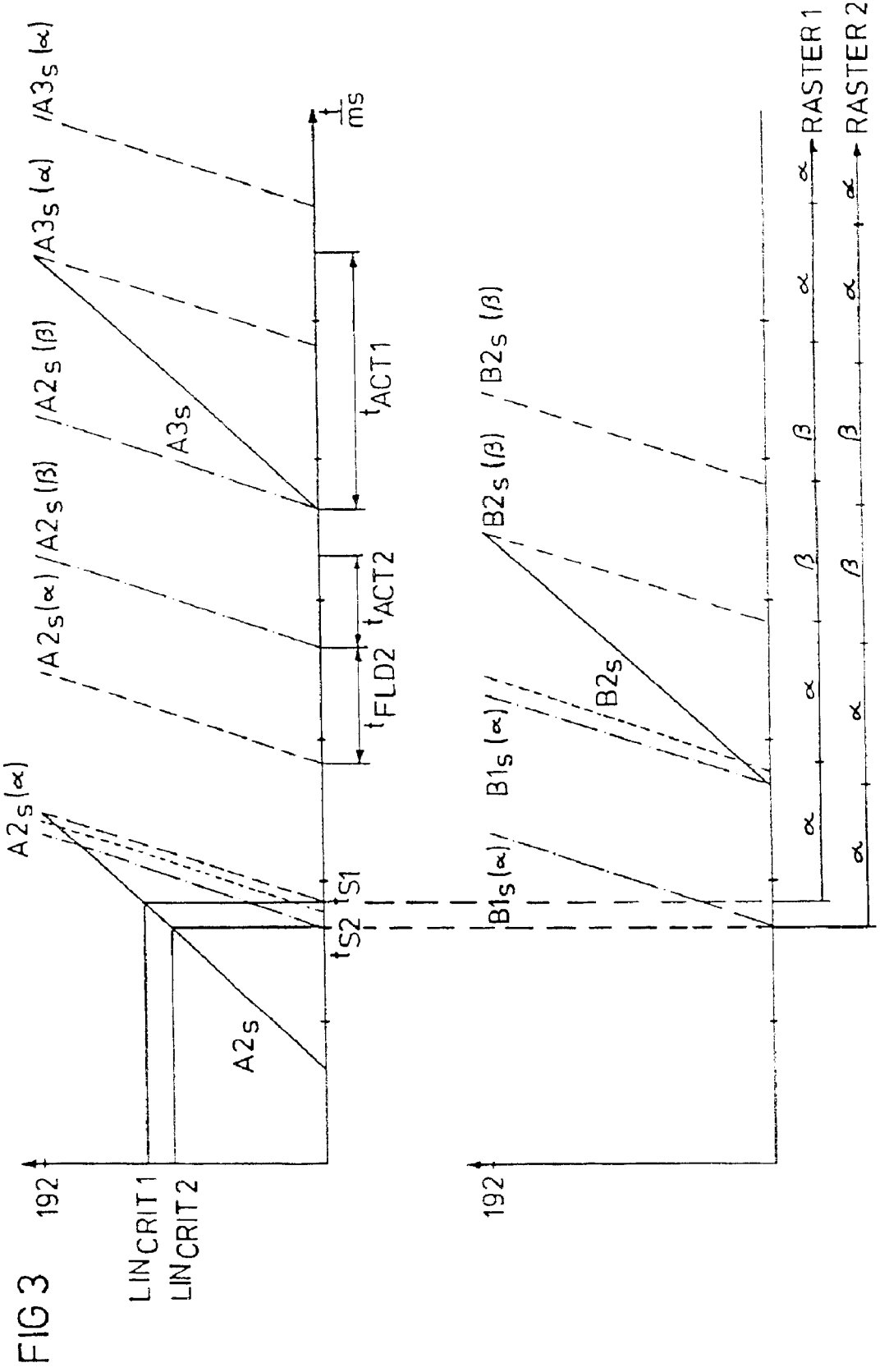
FIG. 3 shows line index diagrams for writing and reading, in two different half picture memories, a second picture sequence including a sequence of first and second half pictures (FIGS. 3a, b), and the time progression of two different rasters to display the overall picture.

The inventive apparatus and method further specifies that the picture data of the second picture sequence are stored in a second picture memory in the form of a picture data signal. Here, the picture data of the first half pictures are stored in a first half picture memory $SPA_S$ of this second picture memory, and the picture data of the second half pictures are stored in a second half picture memory $SPB_S$ of this second picture memory. Using solid lines, FIG. 3 illustrates the write pointers for writing the picture data of a sequence of first half pictures $A2_S$, $A3_S$, . . . into the first half picture memory $SPA_S$, and the picture data of a sequence of second half pictures $B2_S$, . . . into the second half picture memory $SPB_S$. For this embodiment it is assumed that the half pictures are also decimated to 192 lines.

The simultaneous display of the first and second picture sequence in an overall picture requires that the picture data of the half pictures $A1_M$, $B1_M$, $A2_M$, . . . and $A2_S$, $B2_S$, $A3_S$, . . . are read out from the respective half picture memories $SPA_M$, $SPB_M$, $SPA_S$, $SPB_S$ synchronously, according to the specification of the raster signal. According to the inventive apparatus and method, as illustrated in FIG. 2, a first phase shift $t_x$ was set for the raster signal, so that the first picture sequence can be displayed in the overall picture without a joint line. To control the read-out process of the picture data of the half pictures of the second picture sequence, a phase shift is specified between the second picture data signal and the display raster or the raster signal, which has been matched to the first picture sequence by the first phase shift.

The phase shift between the second picture data signal and the raster signal is preferably evaluated by evaluating the position of a write pointer of the second picture memory at the beginning of a period of the raster signal or at the beginning of α raster phase. FIG. 3 illustrates the time progression of two different display rasters RASTER1 and RASTER2, whose periods and first a phases begin at times $t_{S1}$, and $t_{S2}$ respectively. The write pointer of the first half picture memory SPAS is situated at a first critical line $LIN_{CRIT1}$ at time $t_{S1}$, and at a second critical line $LIN_{CRIT2}$ at time $t_{S2}$. The read-out processes, which take place according to the specification of the first display raster RASTER1, are shown in FIG. 3 by dashed lines; the read-out processes which take place according to the specification of the second display raster RASTER2, are shown by dash-dot lines.

FIG. 3 illustrates that the half pictures stored in the first half picture memory $SPA_S$ can be displayed without a joint line in the α raster and the half pictures stored in the second half picture memory $SPB_S$ can be displayed without a joint line in the β raster, in the case of read-out processes which begin at times later than $t_{S1}$ but before a new write process. The picture data should be read out for display from the half picture memory into which they have just been written, if the write pointer at the beginning of a period of the raster signal and thus at the beginning of the display of the overall picture is situated above the first critical line $LIN_{CRIT1}$. For the embodiment illustrated in FIG. 3, if the display raster RASTER1 is present, the half pictures $A2_S$, $A3_S$, . . . are displayed in the α raster and the half pictures $B2_S$, . . . are displayed in the β raster. If, at the beginning of a period of the raster signal and of the display raster, the second half picture memory $SPB_S$ has been written on, and if the write pointers are situated above the first critical line $LIN_{CRIT1}$, the half pictures $A_M$ would be displayed in the β raster and the half pictures $B_M$ in the α raster.

In the case of read-out processes which begin between the beginning of the first write process into the first half picture memory and the time $t_{S2}$, the half pictures stored in the first half picture memory cannot be displayed in the α raster without a joint line, since the read-out process would overtake the write-in process, as the intersection points of the dashed read pointer $A2_S(\alpha)$ and the write pointer $A2_S$ show. For the case illustrated in FIG. 3, the half pictures in the αraster are read out from the second half picture memory. The inventive apparatus and method generally specifies that the picture data are to be read out for display from that half picture memory which has not just been written on, if the write pointer is situated below the second critical line $LIN_{CRIT2}$ at the beginning of a period of the raster signal and thus at the beginning of the display of the entire picture. Therefore, in the embodiment shown in FIG. 3, the half pictures $A2_S$, $A3_S$, . . . are displayed in the β raster and the half pictures $B2_S$, . . . are displayed in the α raster if the display raster RASTER2 is present. In this case, the picture sequence must be corrected by one line for the A-half pictures.

If the read-out process begins between the times $t_{S1}$ and $t_{S2}$, and the write pointer therefore is situated between the first and second critical line, as this is shown in FIG. 3 by the dotted line, a display without a joint line is not possible either by reading out the half pictures $A2_S$, $A3_S$, ... during the α raster or during the β raster, as the intersection points of the dotted read pointers and the write pointers $A2_S$, $B2_S$ indicate. Therefore, a second phase shift of the raster signal and of the display raster is required, if the write pointer of the second picture memory is situated between the first and second critical line $LIN_{CRIT1}$ and $LIN_{CRIT2}$ at the beginning of the raster signal which is matched to the first picture sequence by the first phase shift. The second phase shift is such that a period of the new raster signal begins later than the time $t_{S1}$ shown in FIG. 3.

At the beginning of a period of the raster signal if none of the half picture memories are written upon, the data should be read out from those half picture memories which were written last.

The value of the first critical line $LIN_{CRIT1}$ is calculated from the time interval $t_{ACT1}$, which is needed to write a half picture, the time interval $t_{ACT2}$, which is available for reading out the half picture, and the number n of lines of the decimated picture (in the present case 192), as follows: $LIN_{CRIT1}=(t_{ACT1}-t_{ACT2})\cdot n/t_{ACT1}$, where $t_{ACT2}$ is calculated in accordance with $t_{ACT1}/(2\cdot DF_S)$, and where $DF_S$ is the decimation factor to decimate the second picture sequence. However, for the embodiment described here, this coincides with $DF_M$.

The value of the second critical line $LIN_{CRIT2}$ is calculated from the time interval between two read-out processes $t_{FLD2}$ and the number of lines n as follows: $LIN_{CRIT2}$ $t_{FLD2}\cdot n/t_{ACT1}$. The maximum required further phase shift of the raster signal is given by the difference $t_{ACT1}-t_{ACT2}-t_{FLD2}$.

The display raster is first matched to the first picture sequence M by a phase shift in such a way that the picture sequence in the overall picture can be displayed at an arbitrary position without a joint line. Here, the half pictures $A_M$ of this picture sequence are always displayed in the α raster. The half pictures of the second picture sequence S are then displayed in dependence on the phase shift between the raster signal and the display raster on the one hand, and the second picture sequence and the second picture data signal on the other hand. The half pictures $A_S$ of the second picture sequence are displayed in the α raster or in the β raster depending on the specified phase shift. An additional phase shift of the raster signal is then applied, if the second picture sequence cannot be displayed without a joint line, according to the specification of the raster signal with the first phase shift. This is the case if the write pointer of the second picture memory is situated between a first and second critical line $LIN_{CRIT1}$, $LIN_{CRIT2}$ at the beginning of a period of the raster signal.

Figure 4:
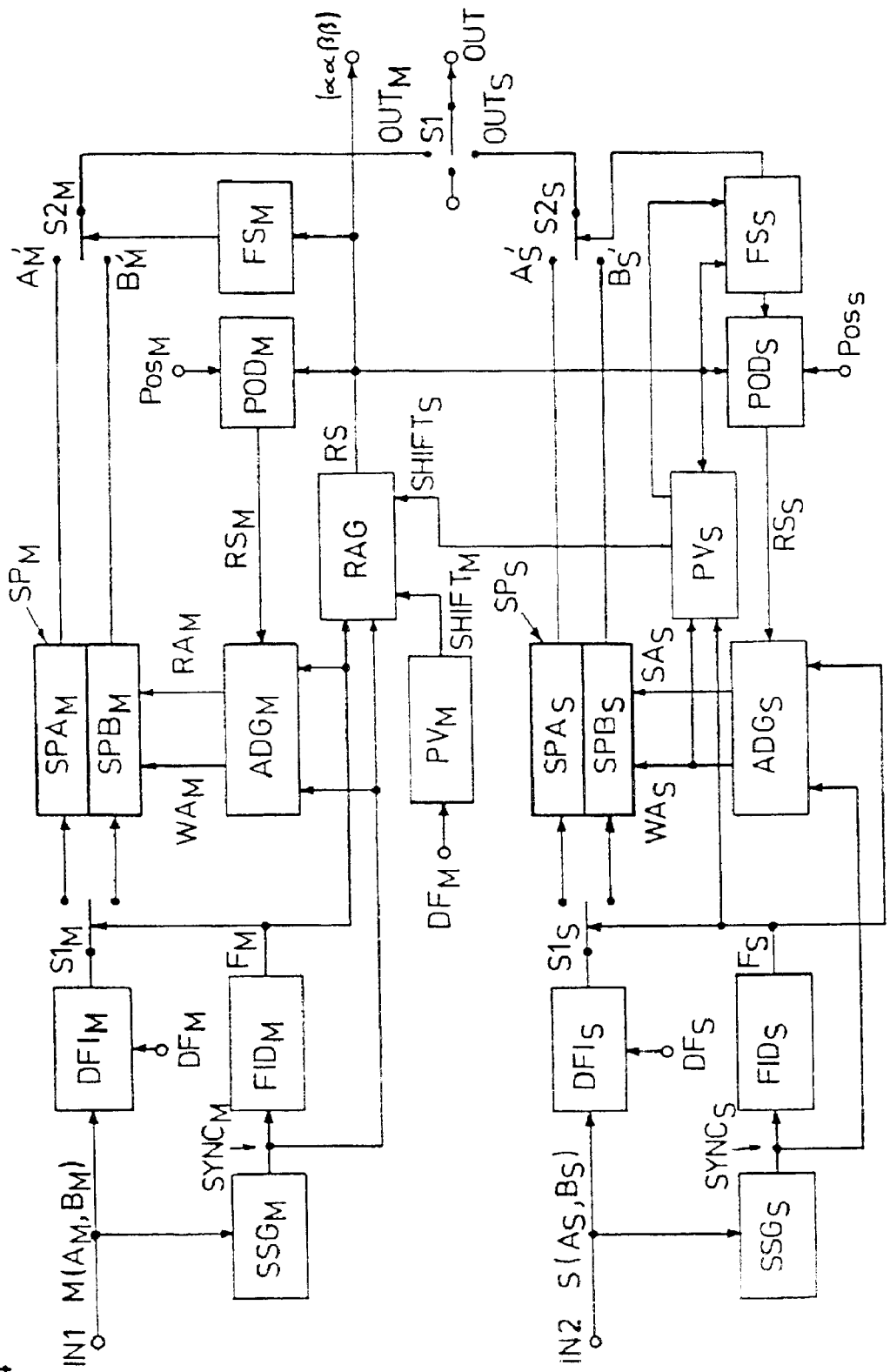
FIG. 4 shows a circuit block diagram of an inventive apparatus in accordance with the first embodiment.

FIG. 4 shows a block circuit diagram of an inventive apparatus to implement the inventive method. The inputs IN1, IN2 of the apparatus include first and second picture sequences M, S, each of which comprises a first and second half picture sequence $A_M$, $B_M$, $A_S$, $B_S$, respectively. The apparatus is constructed with two channels for processing the first and second picture sequences, respectively for processing the input signal.

The inputs IN1, IN2 are followed by decimation filters $DFI_M$, $DFI_S$ respectively, which are used to decimate the half pictures $A_M$, $B_M$, $A_S$, $B_S$ respectively by a selectable decimation factor $DF_M$, $DF_S$. The decimation filters $DFI_M$, $DFI_S$ are followed by picture memories $SP_M$, $SP_S$ for storing the picture data. Each picture memory $SP_M$, $SP_S$ includes a first and second half picture memory $SPA_M$, $SPB_M$, $SPA_S$, $SPB_S$. In each of the half picture memories $SPA_M$, $SPB_M$, $SPA_S$, $SPB_S$, the picture data are stored in a sequence of half pictures $A_M$, $B_M$, $A_S$, $B_S$. The half picture memories $SPA_M$, $SPB_M$, $SPA_S$, $SPB_S$ are scaled in such a way that a half picture can be stored with a minimal decimation factor $DF_M$, $DF_S$.

The switches $S1_M$, $S1_S$, which can be switched according to the specification of a half picture signal $F_M$, $F_S$, are used to switch between the half picture memories $SPA_M$, $SPB_M$, $SPA_S$, $SPB_S$. From the received picture sequences M, S, a synchronization signal generator $SSG_M$, $SSG_S$ generates synchronization signals $SYNC_M$, $SYNC_S$, which contain information about the time progression of the received half pictures $A_M$, $B_M$, $A_S$, $B_S$, and information whether the received half picture is a first or a second half picture. From the synchronization signal $SYNC_M$, $SYNC_S$, a half picture identifier $FID_M$, $FID_S$ generates the half picture signal to drive the switches $S1_M$, $S1_S$. The synchronization signals also control the process of writing the picture data into the picture memories $SP_M$, $SP_S$. For this purpose, they are conducted to address generators $ADG_M$, $ADG_S$, which generate write addresses $WA_M$, $WA_S$ for writing the picture data into the picture memories $SP_M$, $SP_S$.

The apparatus also includes raster generator RAG, which generates raster signal RS, according to the specification of the synchronization signal $SYNC_M$, which has been generated from the first picture sequence, and according to the half picture signal $F_M$ and a phase shift $SHIFT_M$. The phase shift $SHIFT_M$ is calculated by a phase shift value computation circuit $PV_M$ for calculating a phase shift $PV_M$ as a function of the decimation factor $DF_M$. The raster signal RS is used to generate a display raster ααββ in which the decimated half pictures stored in the half picture memories $SPA_M$, $SPB_M$, $SPA_S$, $SP_B$, are jointly displayed on the screen. Together with the position signals $POS_M$, $POS_S$, the raster signal RS controls the read-out of the half pictures from the half picture memories $SPA_M$, $SPB_M$, $SPA_S$, $SPB_S$. The raster signal RS and the position signals $POS_M$, $POS_S$ are here conducted to the position decoders $POD_M$, $POD_S$, respectively. These position decoders generate signals for the read-start $RS_M$, $RS_S$, in dependence on these signals. The signals $RS_M$, $RS_S$ are conducted to the address generators $ADG_M$, $ADG_S$.

The raster generator RAG includes a feedback branch with a second phase shift calculation circuit $PV_S$ to calculate a phase shift value. The raster signal RS, the write signal $WA_S$, and the half picture signal $F_S$ of the second channel are conducted to the second phase shift calculation circuit $PV_S$. In dependence on these signals, the circuit $PV_6$ calculates a further phase shift $SHIFT_S$ of the raster signal, which may be necessary as explained above to ensure the second picture sequence can be displayed without a joint line. If the write pointer is situated between a first and second critical line at the beginning of a period of the raster signal, a further phase shift is needed so that the second picture sequence can be displayed without a joint line. The second phase shift calculation circuit $PV_S$ calculates this further phase shift $SHIFT_S$, by which the raster signal is shifted in addition to the shift specified by the first phase shift $SHIFT_M$.

The apparatus shown here in particular makes it possible to adjust the phase shift of the raster signal RS step-by-step. Thus the first phase shift $SHIFT_M$ is first set in dependence on the first decimation factor $DF_M$, in such a way that the first picture sequence M can be displayed without a joint line. Then a check is made whether the additional phase shift $SHIFT_S$ is necessary, so that the second picture sequence can also be displayed without a joint line. At the beginning of the process, when the phase shift of the raster signal RS has not yet been set correctly, a joint line can occur both with the first and the second picture sequence M, S. The phase shift is preferably adjusted in several steps, so that the electron beam deflection unit can follow the change of the vertical deflection frequency invisibly to the viewer.

When the read-start signals $RS_M$, $RS_S$ are received, the address generators $ADG_M$, $ADG_S$ generate read addresses $RA_M$, $RA_S$, and the two half picture memories $SPA_M$, $SPB_M$ and $SPA_S$, $SPB_S$ of each picture memory $SP_M$, $SP_S$ are read out in dependence on these addresses. Which of the read-out half pictures $A_M'$, $B_M'$, $A_S'$, $B_S'$ are placed on the outputs $OUT_M$, $OUT_S$ of the two channels is determined by the position of the two switches $S2_M$, $S2_S$, which are switched to select the half pictures in accordance with the specification of switch controllers $FS_M$, $FS_S$. For this purpose, the raster signal RS is conducted to the first switch controller $FS_M$ that sets the switch $S2_M$ in such a way that the first half pictures $A_M$ of the first picture sequence M are always displayed in the α raster of the overall picture, and the second half pictures $B_M$ are always displayed in the β raster.

Besides the raster signal RS, a signal from the second phase shift circuit $PV_S$ is conducted to the second switch controller $FS_S$ to calculate the second phase shift. The switch $S2_S$ is set in such a way that the half picture from that half picture memory which has just been written on is placed on the output $OUT_S$, if the write pointer is situated above a first critical line at the beginning of a period of the raster signal, and that the half picture from that half picture memory which has not just been written on is placed on the output $OUT_S$ if the write pointer is situated below a first critical line at the beginning of a period of the raster signal. If none of the half picture memories $SPA_M$, $SPB_M$, $SPA_S$, $SPB_S$ are written on at the beginning of a period of the raster signal, the switch $S2_S$ is set in such a way that the half picture memory is read out which has been written on last.

When the second picture sequence is displayed, it can happen that the first half picture. $A_S$ is displayed in the β raster and thus the second half picture $B_S$ is displayed in the α raster. To assure a correct nesting of the two half pictures $A_S$, $B_S$, the half pictures $A_S$ must be shifted one line up. This is achieved by the position detector $POD_S$ in this case generating the read-start signal $R_S$ one line earlier. The second means $FS_S$ is connected to the position detector $POD_S$.

The raster signal RS is chosen in such a way that the two picture sequences can be displayed without a joint line at any position on the screen. The position on the screen at which they are displayed depends on the position signals $POS_M$, $POS_S$. Together with the raster signal RS, these signals determine when the half picture memories $SPA_M$, $SPB_M$, $SPA_S$, $SPB_S$ begin to be read out, and thus determine the display of the half pictures within the raster.

Another switch S1 switches between the half pictures placed on the outputs $OUT_M$, $OUT_S$ of the inventive apparatus, depending on the position of the picture sequences which are to be displayed on the screen. For example, if the picture sequences are to be displayed next to one another in the same size, the switch S1 will connect the output $OUT_M$ to the output OUT for the duration of a half line, and will connect the output $OUT_S$ to the output OUT for the duration of a half line. If borders are to be displayed, it is possible to place a signal B for displaying border values on the output OUT. For reasons of clarity of illustration, FIG. 4 does not show the circuit which drives the switch S1.

Advantageously, the first and second picture sequences M, S can be scaled and positioned at will in a simultaneous display, especially a display of the picture sequences next to one another, below one another, or a picture-in-picture.

The inventive apparatus is suited for a conventional AABB transformation of the picture sequence M, if no second picture sequence S is applied to the input IN2, and if the decimation factor $DF_M=1$.

Although the present invention has been shown and described with respect to several preferred embodiments thereof, various changes, omissions and additions to the form and detail thereof, may be made therein, without departing from the spirit and scope of the invention.

What is claimed is:

1. A method for the simultaneous display of at least a first and second picture sequence in an overall picture, the method comprising:

the picture data belonging to a picture of the first picture sequence are stored in the form of a first picture data signal in a first picture memory the picture data belonging to a picture of the second picture sequence are stored in the form of a second picture data signal in a second picture memory, such that the first and second picture sequences respectively include a sequence of half pictures, the picture data of the first half pictures always being stored in a first half picture memory of the picture memory, and the picture data of the second half pictures always being stored in a second half picture memory of the picture memory;

the picture data are read out from the first and second picture memory in such a way that the overall picture is displayed in first and second line rasters, which are repeated respectively in immediate succession, such that the picture data are read out phase-shifted relative to the picture data signals, in accordance with the periodic raster signal, characterized in that the first and second picture sequences are displayed in the overall picture respectively in correspondence with a first decimation factor and a second decimation factor; and that the phase shift of the raster signal is set in dependence on the first and second picture data signal and in dependence on the first and second decimation factor.

2. The method of claim 1, wherein the first and second picture data signals are decimated respectively by the first and second decimation factor before they are stored in their respective picture memory.

3. The method of claim 1, wherein the phase shift of the raster signal is adjusted step-by-step, such that a first phase shift is set in dependence on the first picture data signal and the first decimation factor, and a further phase shift is set in dependence on the phase of the second picture data signal relative to the raster signal with the first phase shift and in dependence on the second decimation factor.

4. The method of claim 3, wherein the picture data of the second picture sequence are stored in the second picture memory line-by-line and that the phase of the second picture data signal relative to the raster signal with the first phase shift is determined with reference to the picture line that is written into the second picture memory at the beginning of a period of the raster signal.

5. The method of claim 4, wherein a further phase shift is set if the line written into the second picture memory at the beginning of a period of the raster signal lies between a first critical line and a second critical line.

6. The method of claim 4, wherein, to display the second picture sequence in the overall picture, that half picture memory is read out which has just been written, if the picture line written into the second picture memory at the beginning of a period of the raster signal lies above a first critical line; that, to display the second picture sequence in the overall picture, that half picture memory is read out which has not just been written, if the line written into the second picture memory at the beginning of a period of the raster signal lies below a second critical line; and that, to display the second picture sequence in the overall picture, that half picture memory is read out which has been written last, if no half picture memory has been written into at the beginning of a period of the raster signal.

7. The method of claim 5, wherein the first critical line $LIN_{CRIT1}$ is calculated as $$LIN_{CRIT1} = \left(t_{ACT1} - \frac{t_{ACT1}}{2 \cdot DF_S}\right) \cdot n / t_{ACT1}$$

where $t_{ACT1}$ is the time needed to store a half picture in the respective half picture memory, and is the number of lines of the decimated picture, and $DF_S$ is the second decimation factor.

8. The method of claim 5, wherein the second critical line $LIN_{CRIT2}$ is calculated as $$LIN_{CRIT2} = t_{FLD2} \cdot n / t_{ACT1}$$

where $t_{ACT1}$ is the time needed to store a half picture in the respective half picture memory; n is the number of lines of the decimated picture, and $t_{FLD2}$ is the time interval between two read processes.

9. The method of claim 1, wherein the first phase shift $t_x$ of the raster signal is calculated as $$t_x = t_{ACT1} - \frac{t_{ACT1}}{2 \cdot DF_M}$$

where $t_{ACT1}$ is the time needed to store a half picture in the respective half picture memories and $DF_M$ is the first decimation factor.

10. The method of claim 9, wherein the picture data are read out from the first picture memory according to the specification of a first position signal, and that the picture data are read out from the second picture memory according to the specification of a second position signal.

11. An apparatus to display at least a first and second picture sequence in an overall picture, comprising:

a first picture memory to store the first picture data signals belonging to pictures of the first picture sequence, which comprises a first half picture memory and a second half picture memory to store the half pictures of the first picture sequence; further comprising a second picture memory to store the second picture data signals belonging to pictures of the second picture sequence, which comprises a first half picture memory and a second half picture memory to store the half pictures of the second picture sequence; and a raster generator to generate a periodic raster signal, which is phase-shifted relative to the picture data signals, characterized in that the apparatus has a first decimation filter and a second decimation filter to decimate the first and second picture sequence in the overall picture by a first decimation factor and respectively by a second decimation factor; and that the phase shift of the raster signal can be adjusted in dependence on the first and second picture data signal and in dependence on the first and second decimation factor.

12. The apparatus of claim 11, wherein the raster generator is connected to means for calculating a first phase shift of the raster signal in dependence on the first picture data signal and on the first decimation factor.

13. The apparatus of claim 12, wherein a feedback branch comprises means for calculating a further phase shift follows the raster generator, and that the raster signal, the second decimation factor, and a write pointer position signal of the second picture memory is conducted to the means to calculate the further phase shift.

14. The apparatus of claim 13, further comprising a first and second position decoder, to which are conducted the raster signal and a first and second position signal respectively, and which are connected to the first and second picture memory respectively to control the reading out of the picture data.

* * * * *

UNITED STATES PATENT AND TRADEMARK OFFICE
CERTIFICATE OF CORRECTION

PATENT NO. : 7,106,384 B1
APPLICATION NO. : 09/913103
DATED : September 12, 2006
INVENTOR(S) : Günter Schefflér Page 1 of 1

It is certified that error appears in the above-identified patent and that said Letters Patent is hereby corrected as shown below:

Column 2
Line 51, delete ". In" and insert --, in--

Column 3
Line 31, delete "α" and insert --a--

Column 4
Line 4, delete "halt" and insert --half--

Column 6
Line 12, delete "α" and insert --a--
Line 14, after "first" delete "a"

Column 8
Line 33, delete "$SP_B$" and insert --$SPB_S$--

Column 10
In the claims, claim 1, line 18, after "memory" insert --,--

Column 11
In the claims, claim 9, line 32, after "shift" delete "$t_x$"

Signed and Sealed this

Twenty-eighth Day of November, 2006

JON W. DUDAS
*Director of the United States Patent and Trademark Office*